Feb. 12, 1946.    C. ARPURTH    2,394,529
ARMATURE WINDING MECHANISM
Filed May 18, 1944    4 Sheets-Sheet 1

INVENTOR
CHARLES ARPURTH
ATTORNEY

Feb. 12, 1946.  C. ARPURTH  2,394,529
ARMATURE WINDING MECHANISM
Filed May 18, 1944  4 Sheets-Sheet 2

INVENTOR
CHARLES ARPURTH
ATTORNEY

Feb. 12, 1946.  C. ARPURTH  2,394,529
ARMATURE WINDING MECHANISM
Filed May 18, 1944  4 Sheets-Sheet 3
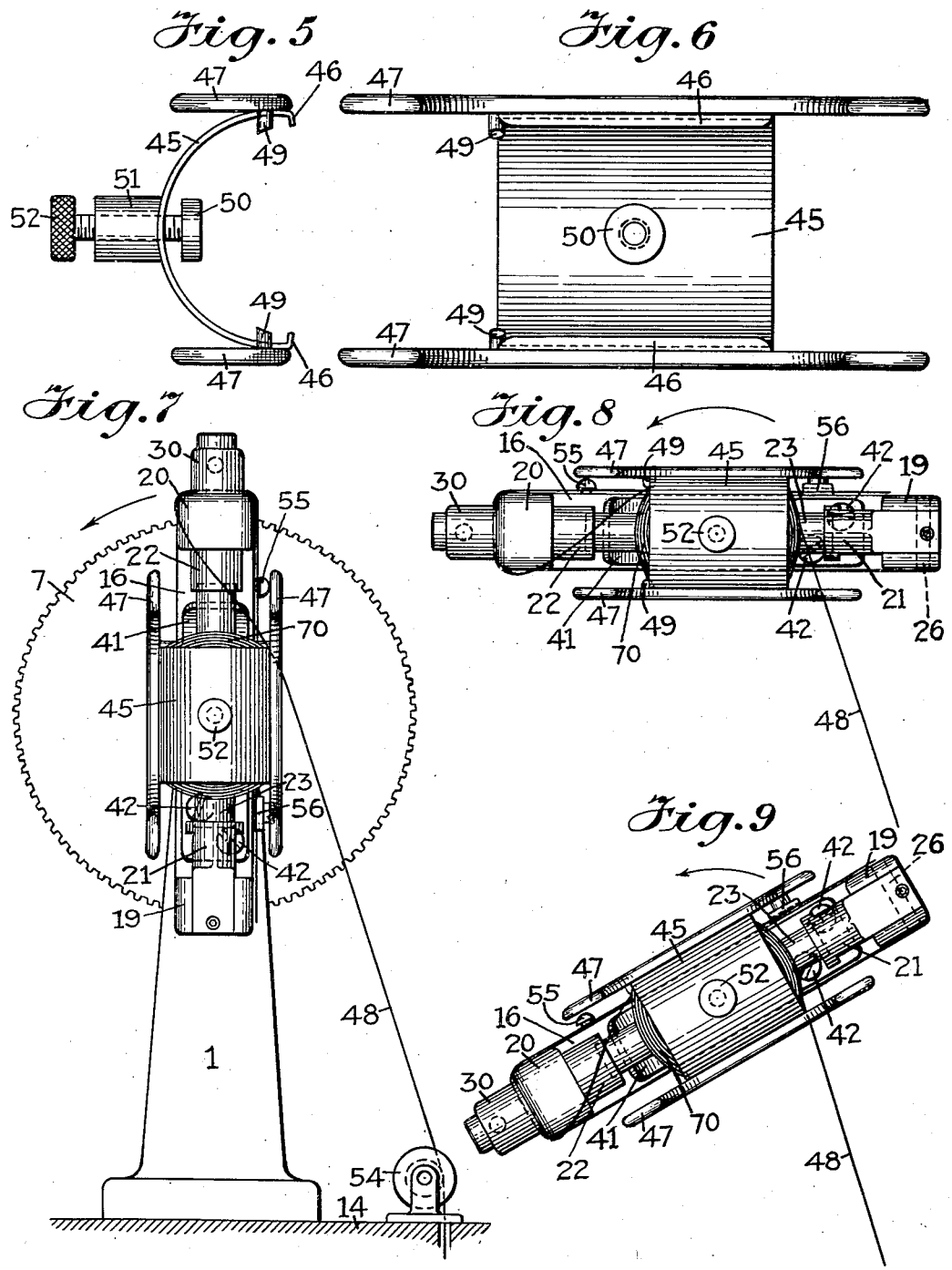
INVENTOR
CHARLES ARPURTH
ATTORNEY

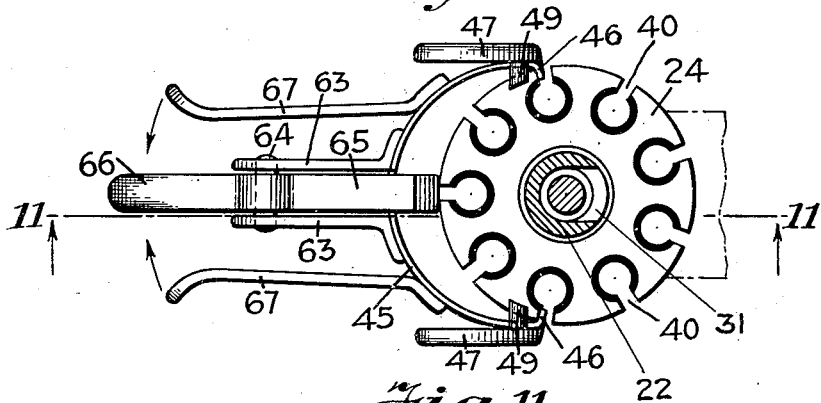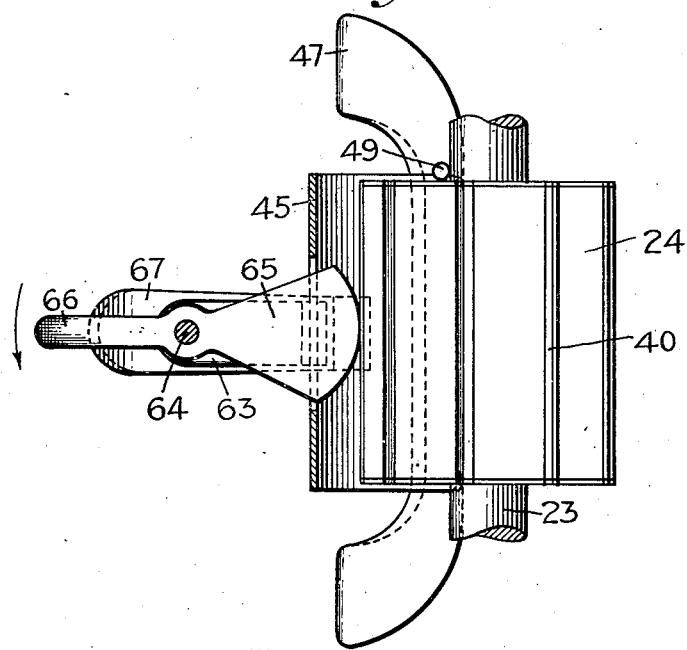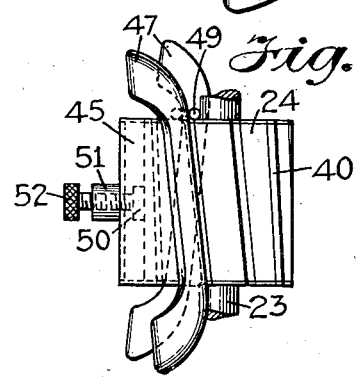

Patented Feb. 12, 1946

2,394,529

UNITED STATES PATENT OFFICE 2,394,529

ARMATURE WINDING MECHANISM

Charles Arpurth, Demarest, N. J., assignor to Ford Instrument Company, Inc., Long Island City, N. Y., a corporation of New York Application May 18, 1944, Serial No. 536,213

16 Claims. (Cl. 242—13)

This invention relates to winding machines and more particularly to a machine for winding the armatures of electric motors or the like and has for an object to provide a machine of the above type having novel and improved characteristics.

Another object is to provide in a mechanism of the above type novel and improved means for supporting the armature and for adjusting and indexing the same as the winding operation progresses.

Various other objects and advantages will be apparent as the nature of the invention is more fully disclosed.

Although the novel features which are believed to be characteristic of this invention are pointed out more particularly in the claims appended hereto, the invention itself may be better understood by referring to the following description, taken in connection with the accompanying drawings in which certain specific embodiments thereof have been set forth for purposes of illustration.

In the drawings:

Fig. 5 is a plan view of the butterfly guide member;

Fig. 6 is a front elevation of the butterfly guide member;

Fig. 7 is an end elevation of the winding machine showing the armature and butterfly guide member in place;

Figs. 8 and 9 are detail views showing steps in the winding operation;

Fig. 10 is a horizontal section similar to Fig. 4, but showing a modified form of butterfly guide member;

Fig. 11 is a vertical section through the guide member taken on line 11—11 of Fig. 10; and Fig. 12 is a detail view of an armature having inclined slots showing a butterfly guide member cooperating therewith.

Figure 1:
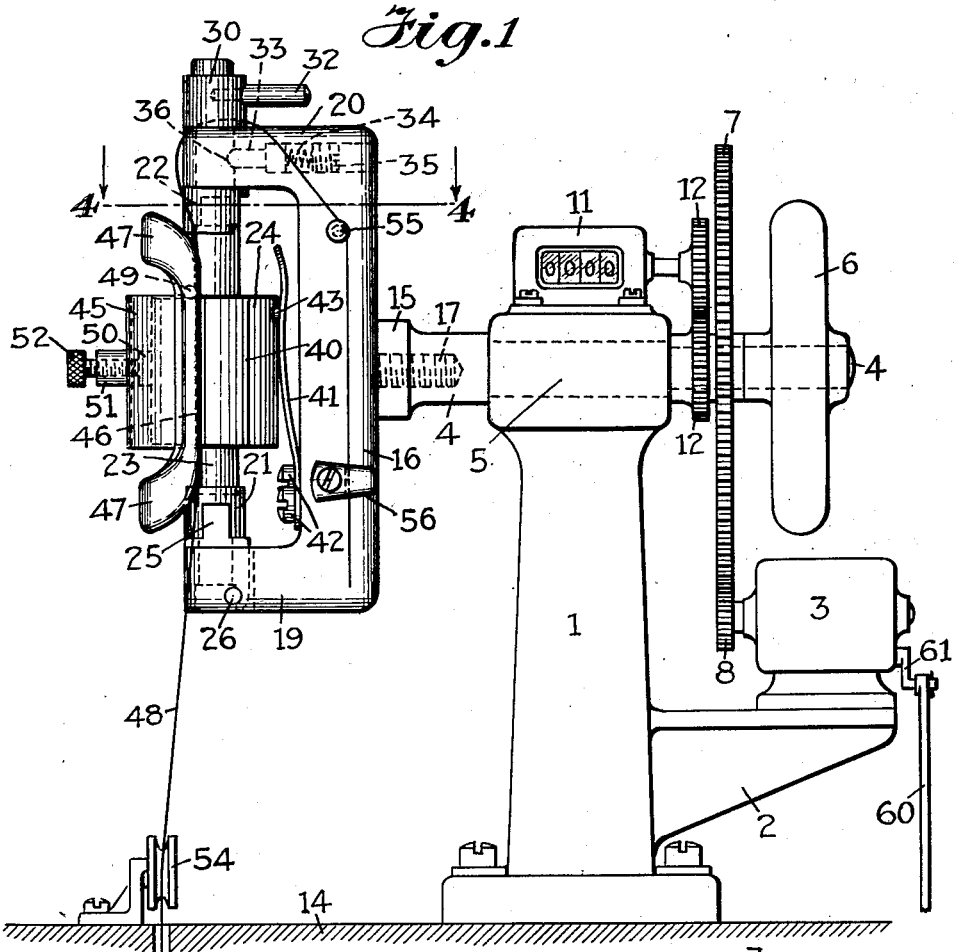
Fig. 1 is a side elevation of a winding machine embodying the present invention.
Figure 2:
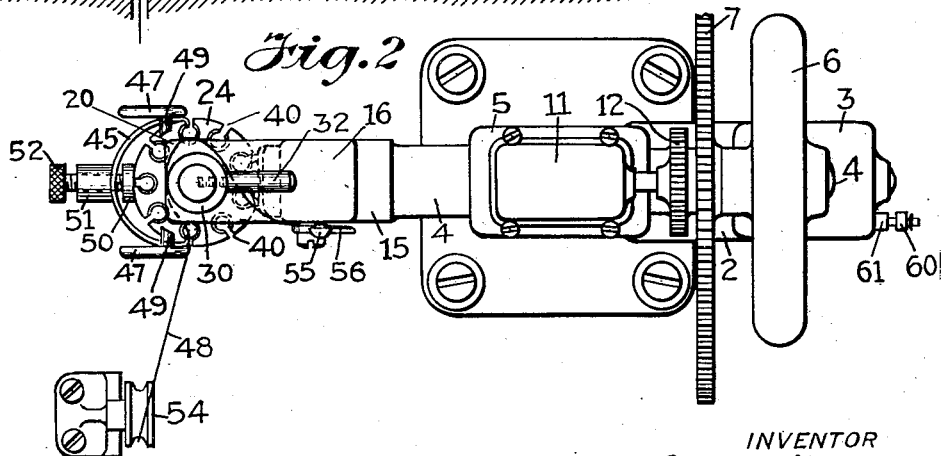
Fig. 2 is a top plan view thereof.

Referring to the drawings more in detail, the invention is shown as embodied in a winding machine comprising a pedestal 1 carrying a bracket 2 on which a driving motor 3 is supported. A horizontal driving shaft 4 is journalled in a bearing box 5 carried by the pedestal 1. The shaft 4 carries a hand-wheel 6 and a gear 7 meshing with a pinion 8 on the shaft of the motor 3. A revolution counter 11 is mounted on the pedestal 1 and is connected to be driven from the shaft 4 by gears 12. The entire assembly is indicated as mounted on a suitable base 14.

At its free end the driving shaft 4 is provided with an enlarged or flanged member 15 to which a yoke 16 is attached by suitable means shown as a screw 17. The yoke 16 is provided with arms 19 and 20 having sockets 21 and 22 respectively suited to receive the ends of a shaft 23 of the armature 24 which is to be wound. The socket 21 is mounted on arm 25 which is pivoted to the arm 19 by a pin 26 to permit the socket to swing outwardly for inserting or removing the armature as indicated in Fig. 3.

Figure 3:
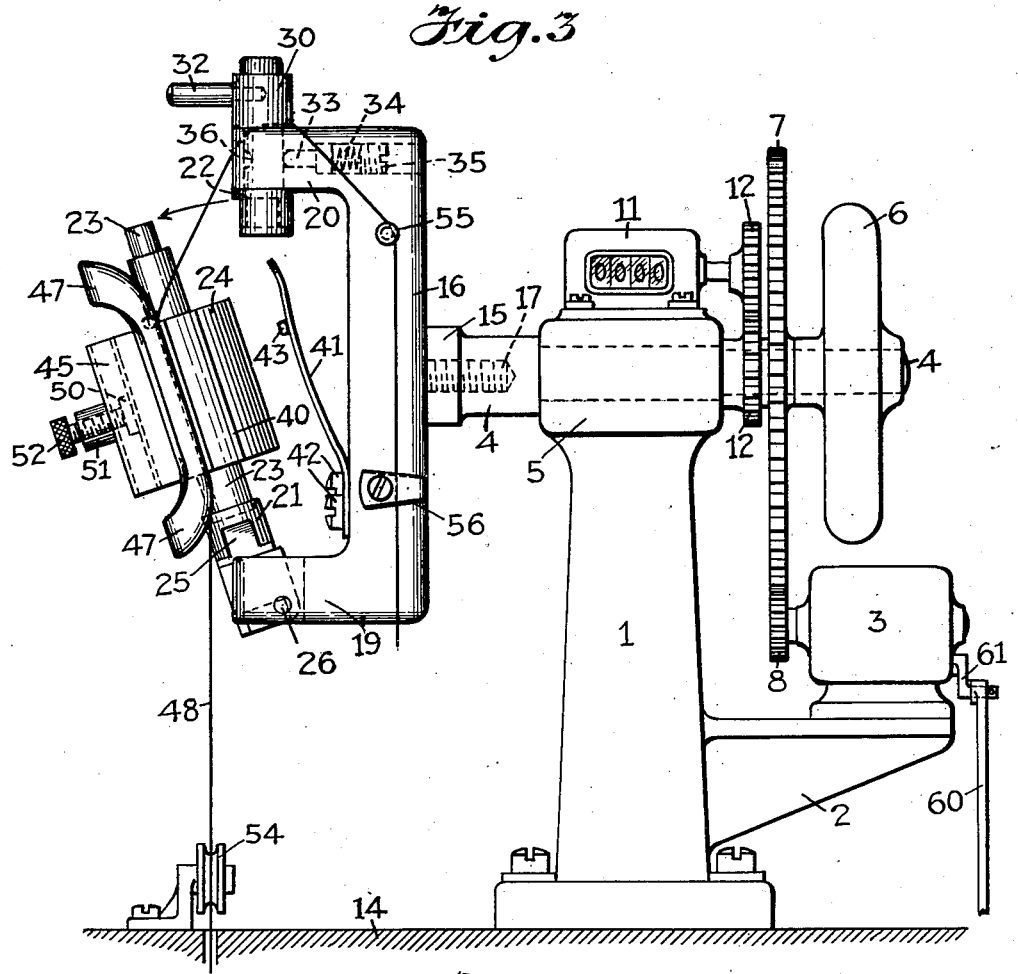
Fig. 3 is a side elevation similar to Fig. 1 but showing the armature in position to be removed from the machine.

The socket 22 is mounted on a stud 30 for rotation in the arm 20 and is provided at one side with a slot 31 (Fig. 4) which releases the armature shaft 23 when the socket 22 is so positioned that the slot faces outwardly as indicated in Fig. 3. A handle 32 is provided for turning the stud 30 in the arm 20 for releasing or securing the armature shaft 23. A detent 33, urged outwardly by a spring 34, is seated in a bore 35 in the arm 20 to engage a positioning recess 36 in the stud 30 to latch the same in position to secure the armature for winding.

The armature 24 is provided with a plurality of slots 40 to receive the winding. A spring 41 is attached to the yoke 16 by suitable means shown as screws 42 and is provided with lugs 43 which engage a pair of the slots 40 to hold the armature 24 against rotation. These lugs 43 may be released from the slots 40 to permit the armature to be indexed to the next winding position by pressing inwardly on the spring 41. In addition, the spring 41 serves to hold the armature shaft 23 rigidly in place in the socket 22 when the socket is turned to latching position as shown in Fig. 1, and to force the shaft outwardly when the socket 22 is turned to release the same as shown in Fig. 3.

Figure 4:
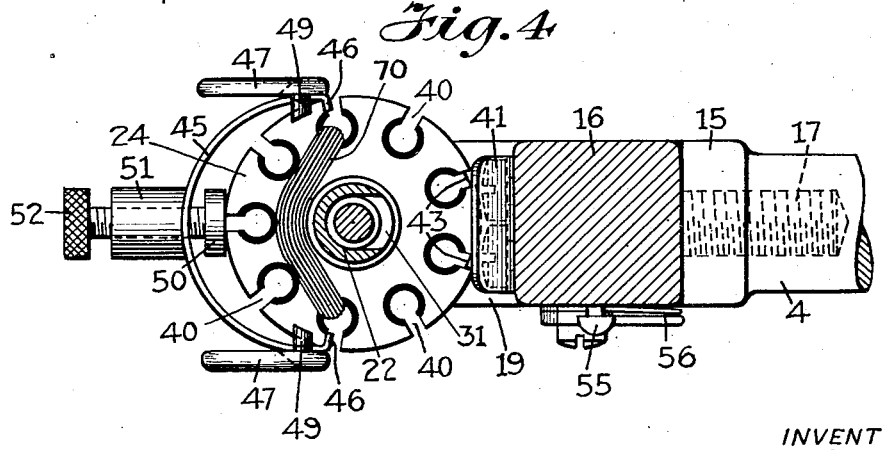
Fig. 4 is a horizontal section taken on the line 4—4 of Fig. 1.

The butterfly guide member as shown in Figs. 5 and 6 comprises an arcuate spring member 45 having inturned flanges 46 at its two ends suited to engage a pair of the slots 40 of the armature for holding the butterfly guide member in place as indicated in Fig. 4. A pair of wire guides 47 are mounted on the two sides of the spring member 45 in a position to guide the wire 48 (Figs. 7 to 9) into the proper slots 40 as the armature is rotated. For accurately positioning the member 45 a pair of lugs 49 are provided which are adapted to rest against the end of the armature 24. The spring member 45 also carries a clamping member 50 which is threaded into a boss 51 carried by the member 45 and is actuated by a knurled knob 52. With the clamping member 50 adjusted to bear against the armature 24 as indicated in Fig. 4, the flanges 46 are pulled against the edges of their slots 40 and secure the butterfly guide member in position.

The wire 48 is fed from a reel (not shown) over a pulley 54 and is then threaded upwardly through the proper slot 40, around the stud 30 and over a pin 55 attached to the yoke 16, and is secured under a spring finger 56 which is likewise mounted on the yoke 16.

In the form indicated, the motor 3 is connected to be controlled by a foot pedal (not shown) actuating a rod 60, (Fig. 1) attached to an arm 61 which controls the motor switch.

In the operation of this device, the armature 24 is readily positioned in the sockets 21 and 22 by the lower end of the armature shaft first being inserted in the socket 21 as indicated in Fig. 3 and then the upper end of the armature shaft is pressed inwardly through the slot 31 in the socket 22. The socket 22 is turned by the handle 32 to secure the armature in place. The butterfly guide member may then be inserted in the proper slots and secured by tightening the clamping member 50. The wire 48 is then threaded as above described and the shaft 4, together with the yoke 16 and armature 24 are rotated, as indicated in Figs. 7, 8 and 9 to wind the wire into the slots 40 into which it is guided by the wire guides 47.

When the revolution counter 11 indicates that the correct number of turns have been thus applied for a coil 70 (Fig. 4), the machine is stopped, the spring 41 pressed inwardly to release the armature 24 and the armature is then indexed to its next winding position, whereupon the spring 41 is released to again secure the armature in place. The butterfly guide member is now released by turning the knob 52 to release the clamping member 50 so that the flanges 46 may be slid axially out of the slots 40. The butterfly guide member is then shifted to the next winding position and the above operations are repeated.

In the modified form of butterfly guide member shown in Figs. 10 and 11, the spring member 45 is provided with inturned flanges 46 as above described. In this case, however, the clamping member 50 is replaced by a pair of arms 63 carrying a pin 64 to which is pivoted a cam 65 having an operating handle 66. The cam 65 is designed to be pressed into clamping engagement with the armature or to be released therefrom by pivotal movement about the pin 64. A pair of arms 67 are also attached to the spring member 45 in a position such that the flanged ends 46 may be sprung outwardly by pressing the arms 67 together. The guide member is provided with the wire guides 47 and the lugs 49 as described in connection with the previous form.

In the embodiment shown in Fig. 12, the slots 40 of the armature are shown as inclined to the axis of the armature and the wire guides 47 and flanges 46 of the butterfly guide member are also shown as inclined to register therewith. The embodiment is otherwise similar to those above described.

It will be noted that the mechanism above described facilitates the mounting of the armature in the winding machine and its removal therefrom and also facilitates the indexing of the armature and the positioning of the butterfly guide member in the selected slots.

Although certain specific embodiments have been shown for purposes of illustration, it is to be understood that the invention is not to be restricted thereto, but is capable of various uses and adaptations as will be readily apparent to a person skilled in the art. The invention is only to be restricted in accordance with the scope of the following claims.

What is claimed is:

1. A machine for winding armatures, comprising a driven shaft, a yoke attached to said shaft having bearing means to rotatably support an armature for winding with its axis transverse to said shaft, a resilient member mounted on said yoke, and a lug positioned on the resilient member to engage a slot of said armature for latching the armature against rotation about its axis, said resilient member being positioned to be pressed inwardly to disengage said lug from the slot to release said armature for indexing.

2. A machine for winding slotted armatures, comprising a driven shaft, a yoke attached to said shaft having bearing means to rotatably support an armature for winding with its axis transverse to said shaft, a spring member mounted on said yoke, said spring member having a lug positioned to enter a slot of said armature for latching the armature against rotation about its axis, said lug being adapted to be withdrawn from said slot by the flexing of said spring member.

3. A machine for winding slotted armatures, comprising a driven shaft, a yoke attached to said shaft having bearing means to rotatably support an armature for winding with its axis transverse to said shaft, a spring member mounted on said yoke, said spring member having a lug positioned thereon to enter a slot of said armature for latching the armature against rotation about its axis, said lug being adapted to be withdrawn from said slots by the flexing of said spring member, a wire guide having means to enter selected slots of said armature, and means including said last means for supporting said guide on said armature.

4. A machine for winding slotted armatures, comprising a driven shaft, a yoke attached to said shaft having bearing means to rotatably support an armature for winding with its axis transverse to said shaft, a spring member mounted on said yoke, said spring member having a lug positioned thereon to enter a slot of said armature for latching the armature against rotation about its axis, said lug being adapted to be withdrawn from said slots by the flexing of said spring member, a wire guide having means to enter selected slots of said armature, and means including said last means for supporting said guide on said armature, said supporting means being releasable for indexing said guide.

5. A winding machine for winding armatures, comprising a driven shaft, a yoke attached thereto having arms on opposite sides of the axis of said shaft, sockets carried by said arms to carry therebetween an armature shaft with its axis transverse to the axis of said first shaft, one of said sockets being rotatably mounted and having a side opening to release said armature shaft when turned outwardly, and spring means carried by said yoke to engage said armature to latch the same in position in said sockets.

6. A winding machine for winding armatures, comprising a driven shaft, a yoke attached thereto having arms on opposite sides of the axis of said shaft, sockets carried by said arms to carry therebetween an armature shaft with its axis transverse to the axis of said first shaft, one of said sockets being rotatably mounted and having a side opening to release said armature shaft when turned outwardly, the other of said sockets being pivoted to swing outwardly with said armature shaft for releasing the same, and spring means carried by said yoke to engage said armature to latch the same in position in said sockets.

7. A winding machine for winding slotted armatures, comprising a driven shaft, a yoke attached thereto having arms on opposite sides of the axis of said shaft sockets carried by said arms to carry therebetween an armature shaft with its axis transverse to the axis of said first shaft, one of said sockets being rotatably mounted and having a side opening to release said armature shaft when turned outwardly, and spring means carried by said yoke, said spring means having members to enter the armature slots to latch the armature in position in said sockets and to prevent rotation of said armature about its axis.

8. An armature winding mechanism comprising a yoke to be attached to a driven shaft, said yoke having bearing means to rotatably support an armature for winding with its axis transverse to said shaft, and a resilient member mounted on said yoke having a lug positioned thereon to engage a slot of said armature for latching the armature against rotation about its axis, said resilient member being positioned to be pressed inwardly to disengage the lug from the slot to release said armature for indexing.

9. A mechanism for winding slotted armatures, comprising a yoke to be attached to a driven shaft, said yoke having bearing means to rotatably support an armature for winding with its axis transverse to said shaft, and a spring member mounted on said yoke, said spring member having a lug positioned to enter a slot of said armature for latching the armature against rotation about its axis, said lug being adapted to be withdrawn from said slot by the flexing of said spring member.

10. An armature winding mechanism comprising a yoke to be attached to a driven shaft, said yoke having arms on opposite sides of the axis of said shaft, sockets carried by said arms to carry therebetween an armature shaft with its axis transverse to the axis of said first shaft, one of said sockets being rotatably mounted and having a side opening to release said armature shaft when turned outwardly, and spring means carried by said yoke to engage said armature to latch the same in position in said sockets.

11. A mechanism for winding slotted armatures, comprising a yoke to be attached to a driven shaft, said yoke having arms on opposite sides of the axis of said shaft, sockets carried by said arms to carry therebetween an armature shaft with its axis transverse to the axis of said first shaft, one of said sockets being rotatably mounted and having a side opening to release said armature shaft when turned outwardly, the other of said sockets being pivoted to swing outwardly with said armature shaft for releasing the same, and spring means mounted on said yoke, said spring means having members to enter selected slots of said armature to latch the same in position in said sockets to prevent rotation of said armature in said sockets.

12. A mechanism for winding slotted armatures, comprising a yoke to be attached to a driven shaft, said yoke having arms on opposite sides of the axis of said shaft, sockets carried by said arms to carry therebetween an armature shaft with its axis transverse to the axis of said first shaft, one of said sockets being rotatably mounted and having a side opening to release said armature shaft when turned outwardly, and spring means carried by said yoke, said spring means having members to enter the armature slots to latch the same in position in said sockets and to prevent rotation of said armature in said sockets.

13. A wire guide for winding slotted armatures, comprising a spring member having inturned side flanges suited to enter selected armature slots, clamping means mounted on said spring member to engage the surface of said armature and effective to pull said side flanges against the sides of said slots to clamp said guide in place, and wire guides carried on the respective sides of said spring member to guide the wire into said slots.

14. A wire guide for winding slotted armatures, comprising a spring member having inturned side flanges suited to enter the armature slots, a clamping member mounted on said spring member to engage the surface of said armature, threaded means to force said clamping member against said armature to thereby cause said side flanges to grip the slots of said armature to hold said guide in place, and wire guides carried on the respective sides of said spring member to guide the wire into said slots.

15. A wire guide for winding slotted armatures, comprising a spring member having inturned side flanges suited to enter the armature slots, a cam member mounted on said spring member and having a cam surface to engage the surface of said armature, said cam member being pivoted to apply a force to said spring member to cause said side flanges to grip the slots of said armature for holding said guide in place, and wire guides carried on the respective sides of said member to guide the wire into said slots.

16. A wire guide for winding slotted armatures, comprising a spring member having inturned side flanges suited to enter selected armature slots, clamping means mounted on said spring member to engage the surface of said armature and effective to pull said side flanges against the sides of said slots to clamp said guide in place, wire guides carried on the respective sides of said spring member to guide the wire into said slots, and arms attached to opposite sides of said spring member and positioned to flex said member for withdrawing said flanges from said slots.

CHARLES ARPURTH.